(12) United States Patent
Burton (10) Patent No.: US 10,412,948 B2
(45) Date of Patent: Sep. 17, 2019

(54) SONAR TRANSDUCER WITH ACOUSTIC SPEAKER

(71) Applicant: Navico Holding AS, Egersund (NO)

(72) Inventor: Aaron Burton, Tulsa, OK (US)

(73) Assignee: NAVICO HOLDING AS, Egersund (NO)

(*) Notice: Subject to any disclaimer, the term of this patent is extended or adjusted under 35 U.S.C. 154(b) by 0 days.

(21) Appl. No.: 15/479,965

(22) Filed: Apr. 5, 2017

(65) Prior Publication Data

US 2018/0279596 A1    Oct. 4, 2018

Related U.S. Application Data

(60) Provisional application No. 62/477,773, filed on Mar. 28, 2017.

(51) Int. Cl.
| | | |
|---|---|---|
| *G10K 11/00* | (2006.01) | |
| *G01S 15/96* | (2006.01) | |
| *A01K 97/12* | (2006.01) | |
| *B63H 20/00* | (2006.01) | |
| *G10K 11/34* | (2006.01) | |

(Continued)

(52) U.S. Cl.
CPC ............ *A01K 97/02* (2013.01); *A01K 97/125* (2013.01); *B63H 20/007* (2013.01); *G01S 15/96* (2013.01); *G10K 11/006* (2013.01); *G10K 11/346* (2013.01); *G10K 11/352* (2013.01)

(58) Field of Classification Search
CPC .... A01K 97/02; A01K 97/125; B63H 20/007; G01S 15/96; G10K 11/006; B63B 2035/738
See application file for complete search history.

(56) References Cited

U.S. PATENT DOCUMENTS

| 4,737,940 A | 4/1988 | Arringotn |
| 4,829,492 A * | 5/1989 | Choi .......................... G01S 7/56 |
| | | 181/124 |

(Continued)

OTHER PUBLICATIONS

Humminbird 360 Imaging advertising literature excerpts; pp. 10-11 and 52-53.

(Continued)

*Primary Examiner* — Anthony D Wiest
(74) *Attorney, Agent, or Firm* — Nelson Mullins Riley & Scarborough LLP (57) ABSTRACT

Various implementations described herein are directed to a marine device including a waterproof housing including a mounting element. The housing is configured to be at least partially submerged in the underwater environment and the mounting element is configured to attach to at least one of a vessel or a trolling motor. The marine device also includes at least one transducer and an acoustic speaker positioned within the housing. The at least one transducer is positioned and oriented within the housing such that the at least one transducer is configured to transmit one or more sonar beams into a portion of the underwater environment when the housing is at least partially submerged. The acoustic speaker is positioned and oriented within the housing such that the acoustic speaker is configured to emit the fish attraction sound into the underwater environment when the housing is at least partially submerged.

20 Claims, 7 Drawing Sheets

(51) Int. Cl.
*G10K 11/35* (2006.01)
*A01K 97/02* (2006.01)

(56) References Cited

U.S. PATENT DOCUMENTS

| | | | | |
|---|---|---|---|---|
| 4,951,410 A | * | 8/1990 | Ly | A01K 79/02 43/17.1 |
| 4,970,700 A | | 11/1990 | Gilmour et al. | |
| 4,995,010 A | * | 2/1991 | Knight | B63H 20/007 367/111 |
| 5,200,931 A | | 4/1993 | Kosalos et al. | |
| 5,260,912 A | | 11/1993 | Latham | |
| 5,483,767 A | * | 1/1996 | Langer | A01K 79/02 43/4 |
| 5,525,081 A | | 6/1996 | Mardesich et al. | |
| 5,568,152 A | | 10/1996 | Janky et al. | |
| 5,675,552 A | | 10/1997 | Hicks et al. | |
| 5,812,494 A | | 9/1998 | Medeiros | |
| 6,160,764 A | | 12/2000 | Powell | |
| 6,449,215 B1 | | 9/2002 | Shell | |
| 6,909,946 B1 | | 6/2005 | Kabel et al. | |
| 6,995,527 B2 | | 2/2006 | DePasqua | |
| 7,333,395 B2 | * | 2/2008 | Lewis | A01K 79/02 367/139 |
| 7,542,376 B1 | | 6/2009 | Thompson et al. | |
| 7,652,952 B2 | | 1/2010 | Betts et al. | |
| 7,729,203 B2 | | 6/2010 | Betts et al. | |
| 8,300,499 B2 | | 10/2012 | Coleman et al. | |
| 8,305,840 B2 | | 11/2012 | Maguire | |
| 8,305,844 B2 | | 11/2012 | DePasqua | |
| 8,605,550 B2 | | 12/2013 | Maguire | |
| 8,792,306 B2 | * | 7/2014 | Palmer | A01K 97/02 367/139 |
| 9,335,412 B2 | | 5/2016 | Proctor | |
| 2002/0044500 A1 | * | 4/2002 | Hansen | G01S 15/88 367/173 |
| 2006/0268664 A1 | * | 11/2006 | Lewis | A01K 79/02 367/139 |
| 2009/0147623 A1 | | 6/2009 | Betts et al. | |
| 2010/0014386 A1 | | 1/2010 | Thompson et al. | |
| 2013/0044569 A1 | | 2/2013 | DePasqua | |
| 2013/0215719 A1 | | 8/2013 | Betts et al. | |
| 2014/0010048 A1 | | 1/2014 | Proctor | |
| 2014/0010049 A1 | | 1/2014 | Proctor | |
| 2016/0207602 A1 | | 7/2016 | Clark | |
| 2016/0259053 A1 | | 9/2016 | Proctor et al. | |
| 2016/0320474 A1 | | 11/2016 | Proctor et al. | |
| 2016/0325814 A1 | | 11/2016 | Antao et al. | |
| 2016/0341827 A1 | | 11/2016 | Horner et al. | |

OTHER PUBLICATIONS

Furuno Model CH-37BB Color Sector Scanning Sonar product literature; Jan. 2012.
Wesmar SS395 Series Sonar product literature; Feb. 2010; http://www.wesmar.com/productbrochures/wesmar_ss395_web.pdf.
D'Amico, et al.; A Brief History of Active Sonar; Aquatic Mammals; vol. 35, No. 4; pp. 426-434; 2009; http://csi.whoi.edu/sites/default/files/literature/Full%20Text.pdf.
Caputi; Power to the People (4 Look Ahead, Interphase iScan 180); Saltwater Sportsman; Sep. 21, 2007; http://www.saltwatersportsman.com/power-people.
Bottom Line Fishin' Buddy product literature; Feb. 2001.
Bottom Line Fishin' Buddy 2255 Manual.
Furuno Model CH-28 Installation Manual; Apr. 10, 1998.
Furuno Model CH-28 Operator's Manual; Dec. 28, 1996.
Furuno Model CH-28 product literature.
Bottom Line Fishin' Buddy product literature; Jul. 14, 1999.
Interphase Sea Scout product Literature; 1994.
Furuno Model CH-18 Color Searchlight Sonar product literature; Feb. 18, 1998.
Wesmar SS90B High Frequency Scanning Sonar product Product literature and Wesmar pricing information; Mar. 1, 1980.
TackleTour; Hydrowave Product Review; Hydrowave—Fact or Fiction?; website visited Apr. 18, 2017 (6 pgs.) http://www.tackletour.com/reviewhydrowave.html.

* cited by examiner

SONAR TRANSDUCER WITH ACOUSTIC SPEAKER

CROSS REFERENCE TO RELATED APPLICATIONS

This application claims priority to U.S. Provisional Application No. 62/477,773 filed on Mar. 28, 2017, entitled "Connection and Features for Interchangeable Nosecone for a Trolling Motor," the entire contents of which is hereby incorporated herein by reference.

FIELD OF THE INVENTION

Embodiments of the present invention relate generally to sonar transducers and, more particularly, to sonar transducers with one or more acoustic speakers.

BACKGROUND

Fisherman often utilize various techniques to aid in attracting fish. For example, some fisherman may use speakers to attract fish in the water. Fisherman may also utilize sonar technology to aid in fishing, such as determining where fish are in the underwater environment. Applicant has developed improved systems for attracting fish and aiding generally in the fishing experience.

SUMMARY

Some fisherman may use an acoustic speaker to attract fish to a fishing location to improve fishing performance. The acoustic speaker may be positioned on a vessel (e.g., watercraft) or a trolling motor, such that at least a portion of the speaker is in the water, and may be configured to emit a sound to attract fish. In some examples, the acoustic speaker may emit a sound configured to attract bait fish, which may in turn attract larger target fish. The sound may be configured for a specific type or species of fish. The sound may simulate a sound made by fish to indicate a feeding frenzy, distress, or the like.

Additionally, fisherman may utilize a sonar transducer to aid in the fishing experience, such as to determine the density of fish in water surrounding a fishing location. The sonar transducer may be positioned on a vessel to be at least partially submerged in the water. The sonar transducer may emit a sonar signal and receive reflections of the sonar signal from the surrounding environment from fish, rocks, logs, the floor of the body of water, or the like.

Fisherman utilizing both the acoustic speakers and the sonar transducer may position both proximate each other at a convenient location. Some positions on a vessel, such as the trolling motor, may not have adequate room to accommodate both the acoustic speaker and the sonar transducer in the same location. In some example embodiments, co-mounting of the sonar transducer and acoustic speaker on a trolling motor may risk the acoustic speaker or transducer extending over a portion of the propeller hub close the propeller blades, which may cause damage if the components were to make contact with each other. Further, positioning equipment on the outside of the trolling motor housing may create a hazard or leave the equipment vulnerable to damage from underwater features, such as rocks.

Described herein are implementations of various technologies for a sonar transducer that includes an acoustic speaker. In one implementation, a marine device may include a waterproof housing including a mounting element. The housing may be configured to be at least partially submerged in the underwater environment. The marine device may also include at least one transducer oriented within the housing and configured to transmit one or more sonar beams into an underwater environment and an acoustic speaker oriented within the housing and configured to emit a fish attraction sound into the underwater environment.

Described herein are also implementations of various technologies for a trolling motor. In one implementation, a trolling motor may include an electric motor having a propeller coupled thereto and a steering shaft configured for coupling the electric motor to a vessel. The trolling motor may include a housing encapsulating the electric motor. Further, the housing may include both at least one transducer and an acoustic speaker. In an example embodiment, the marine device is configured to be operably coupled to a trolling motor.

In some example embodiments, the marine device is configured to be operably coupled to a hull of a vessel.

In an example embodiment, the fish attraction sound comprises a bait fish attraction sound.

In an example embodiment, the fish attraction sound comprises a fish distress sound or a feeding frenzy sound.

In some example embodiments, the marine device also includes insulation material disposed between the at least one transducer and the acoustic speaker. In an example embodiment, the insulation material is magnetic or acoustic insulation.

In some example embodiments, the marine device also includes processing circuitry configured to control the operations of both the acoustic speaker and the at least one transducer.

In an example embodiment, the processing circuitry is further configured to cause the speaker to emit the fish attraction sound in response to a determination of fish activity based on sonar data received by the at least one transducer. In some example embodiments, the processing circuitry is disposed within the housing.

In an example embodiment, the at least one transducer and the acoustic speaker are disposed on the same printed circuit board.

In some example embodiments, the housing defines an emitting surface designed to enable transmission of the sound emitted from the acoustic speaker into the underwater environment, the emitting surface defines at least one of a different material or different thickness as compared to at least some of the housing, and the speaker is oriented within the housing to align with the emitting surface. In an example embodiment, the housing also includes a flow baffle configured to direct the flow of water around the emitting surface.

In an example embodiment, the housing is streamlined.

In some example embodiments, the at least one transducer and the acoustic speaker are configured to operate in different frequencies.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques are described herein with reference to the accompanying drawings. It should be understood, however, that the accompanying drawings illustrate only the various implementations described herein and are not meant to limit the scope of various techniques described herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Figure 1:
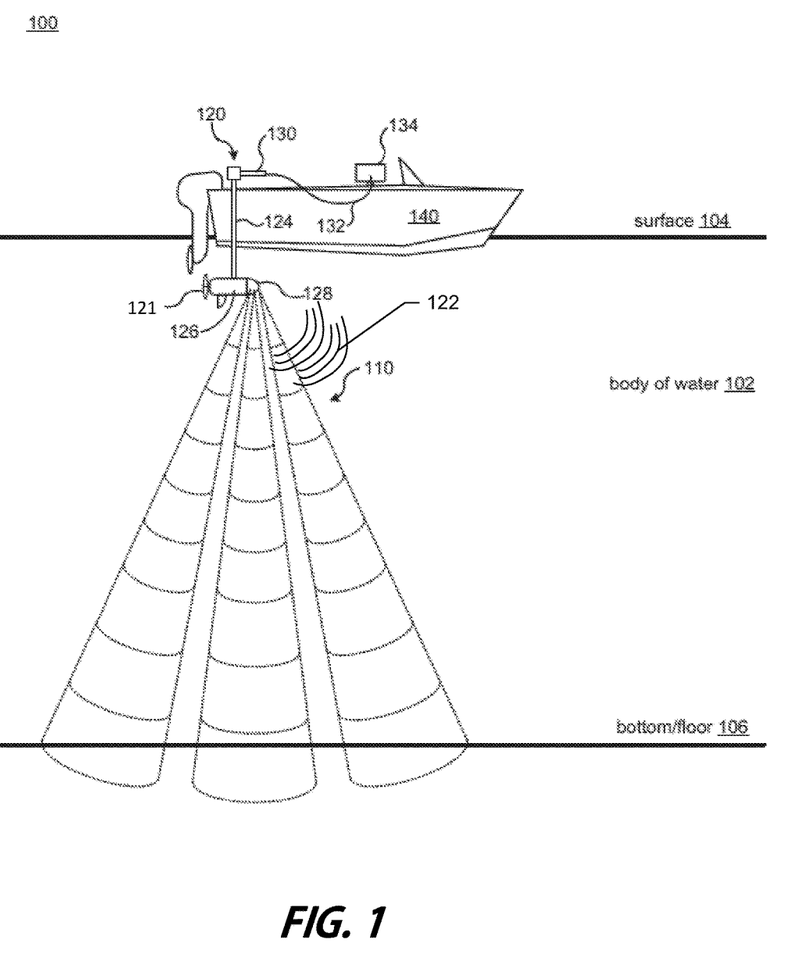
FIG. 1 illustrates a use of an example combined sonar transducer and acoustic speaker within a trolling motor, in accordance with various embodiments described herein.

FIG. 1 illustrates a view of using marine device in accordance with various implementations described herein. The marine device may be operably coupled to or housed within a trolling motor 120, as discussed below in reference to FIGS. 2A-2D, or otherwise operably coupled to a vessel 140.

In some implementations, the trolling motor 120 includes a device having a motor (not shown) with a propeller 121 coupled thereto and a shaft 124 coupling the motor to the vessel 140 (e.g., boat). As shown in FIG. 1, the trolling motor 120 may be coupled or mounted to a stern of the vessel 140. In some instances, the trolling motor 120 may be coupled or mounted to another part of the vessel 140, such as, e.g., a bow of the vessel 140 or some other useful part of the vessel 140. During operation, the motor is configured to drive the propeller 121 to provide thrust for the vessel 140 in water, such as a body of water 102. The shaft 124 may be configured to rotate relative to the vessel 140 to allow steering of the vessel 140 via user interaction with a handle 130 in the body of water 102 during operation of the motor. In some examples, the trolling motor 120 may include use of a manually operated steering mechanism; however, in other examples, the trolling motor may use a motorized mechanism for steering, which may include use of a cable steer type trolling motor or an electric steer type trolling motor.

Figure 2A:
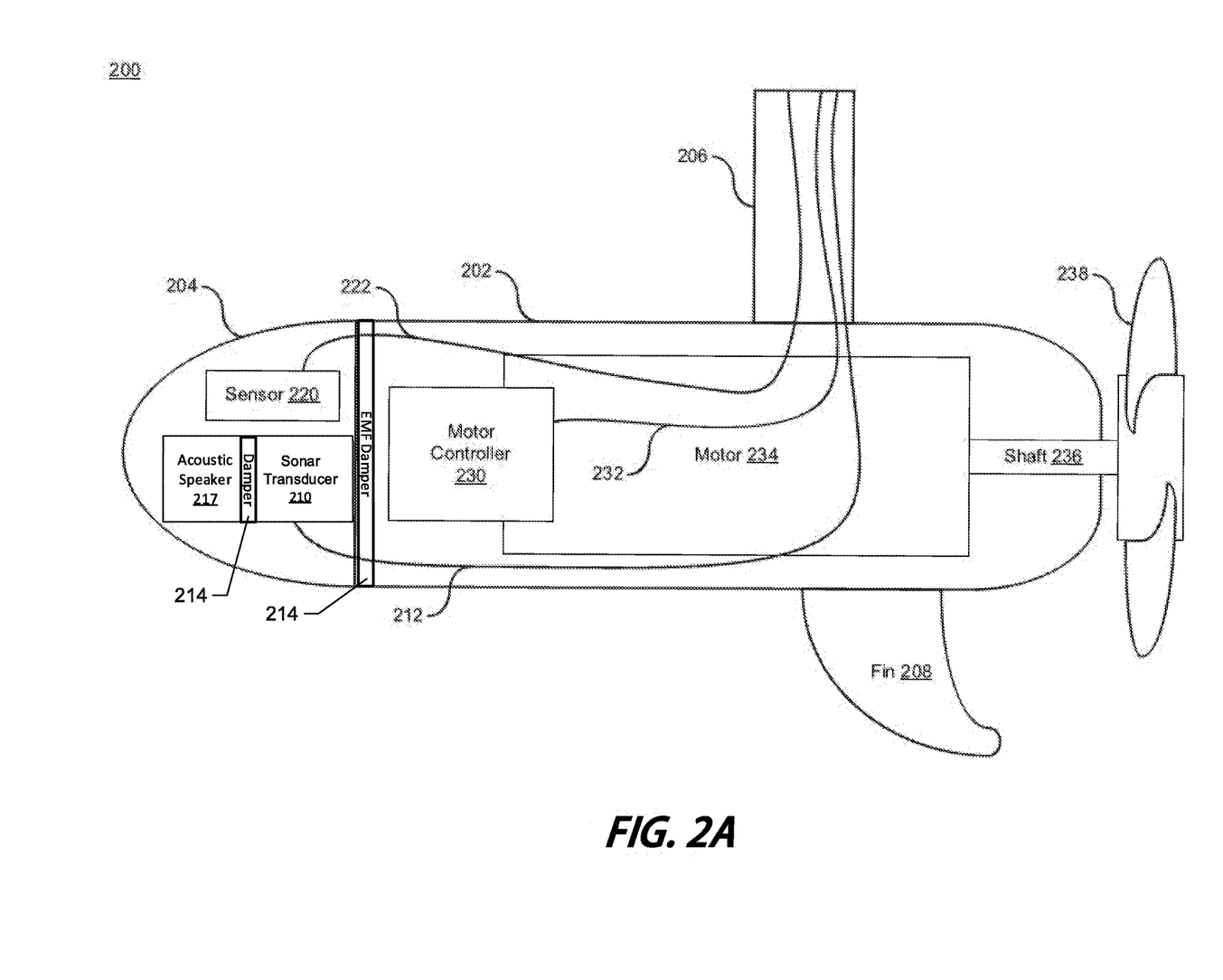
FIGS. 2A-2D illustrate diagrams of example marine devices, in accordance with various embodiments described herein.
Figure 2B:
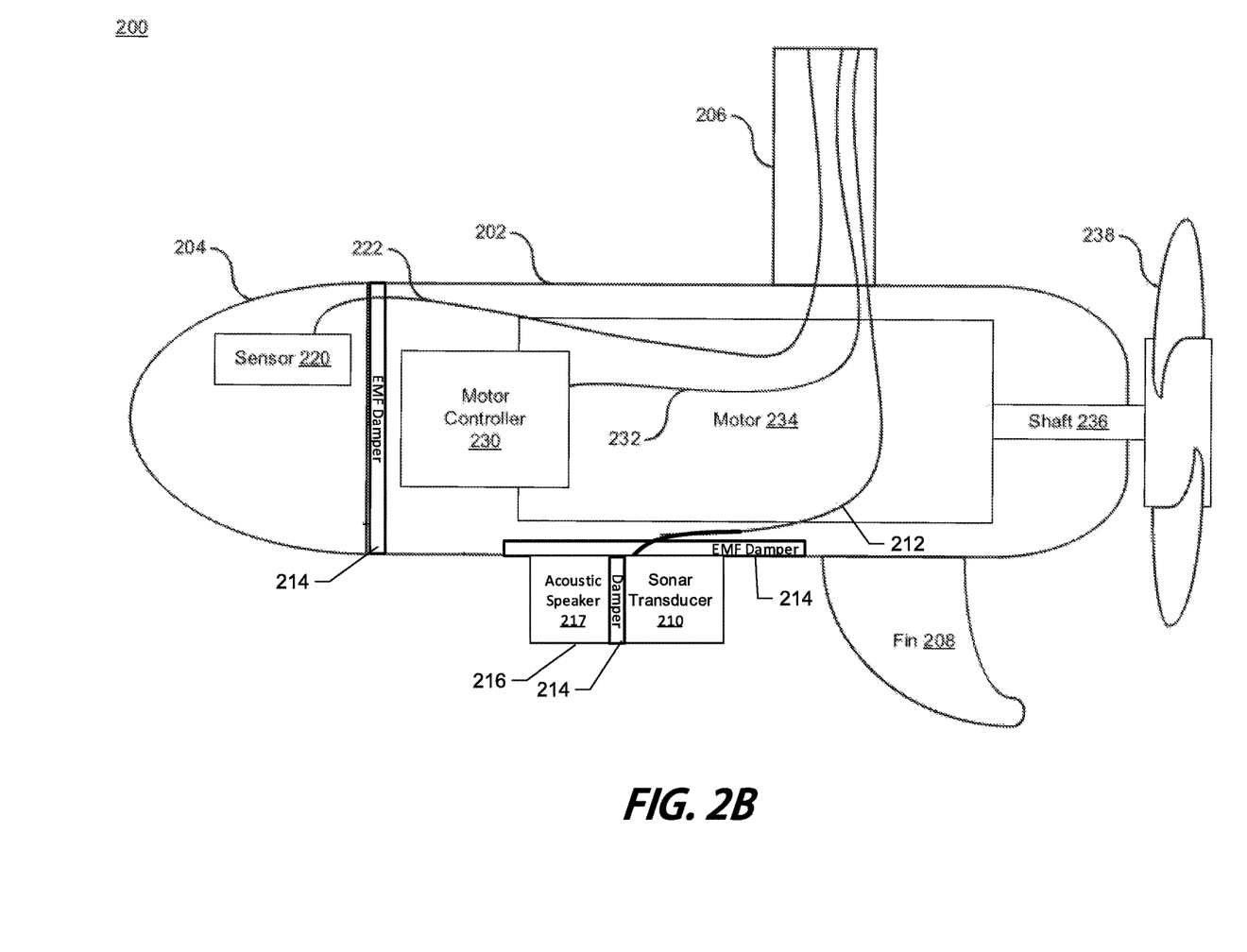

The trolling motor 120 may include a housing 126 that encapsulates the motor, and the housing 126 in turn, may include a nosecone 128. One or more transducers, such as depicted in FIGS. 2A and 2B, may be incorporated within the housing 126, nosecone 128, or otherwise mounted to the trolling motor 120 or vessel 140. In some example embodiments, the trolling motor 120 may include a transducer assembly including two or more transducers or transducer arrays, each of which may be housed within the housing 126 and/or the nosecone 128. In some example embodiments, an acoustic speaker may also be incorporated within the housing 126, nosecone 128, or otherwise mounted to the trolling motor 120 or vessel 140.

The housing 126 may be configured to enclose the motor, acoustic speaker, and one or more transducers within a waterproof capsule that is impervious to water. The housing 126 and the nosecone 128 may be streamlined, such that the housing 126 and nose cone are formed with a hydrodynamic profile or hydrodynamic contour, such as a torpedo shape.

As noted above, in some example embodiments, the trolling motor 120 may include an acoustic speaker in the housing 126, the nosecone 128, or the like. The acoustic speaker may be configured to emit a fish attraction sound 122 into the surrounding water. In an example embodiment, the fish attraction sound 122 may be configured to attract bait fish, which may in turn attract larger target fish. In some example embodiments, the fish attraction sound 122 may be configured for a specific type of fish or species. The fish attraction sound 122 may, for example, simulate a sound made by fish to indicate a feeding frenzy, distress, or the like.

As shown in FIG. 1, the trolling motor 120 may be a stand-alone device that may be coupled to the vessel 140 and deployed in the body of water 102. The vessel 140 may be configured to float on a surface 104 of the body of water 102. During operation, the one or more transducers incorporated within the nosecone 128 and/or the housing 126 may be configured for imaging various environmental features (e.g., fish, plants, rocks, etc.) in the body of water 102. This imaging may include mapping an underwater environment below the surface 104 of the body of water 102 between the surface 104 and a bottom or floor 106 of the body of water 102. The shaft 124 may be configured to rotate the housing 126 relative to the vessel 140 via user interaction with the handle 130 to rotate the nosecone 128 (including the incorporated transducer) at least 360° for imaging a 360° view of the underwater environment below the surface 104 of the body of water 102.

As shown in FIG. 1, one or more sonar beams 110 may be generated by the one or more sonar transducers incorporated within the nosecone 128 and/or the housing 126 of the trolling motor 120 when deployed in the body of water 102. In some instances, a plurality of transducer elements may be embodied in a transducer array, each including one or more transducer elements. One example transducer array may be a forward scanning sonar transducer array including spotlight scan transducers that are built-in to the nosecone 128. The spotlight scan transducers may be referred to as forward scanning (or forward looking) sonar transducers. In some instances, the transducer array may include one or more of a right scanning (e.g., sidescan) element, a left scanning (e.g., sidescan) element, a conical sonar element, and/or a bar downscan sonar element, which may be housed inside the nosecone 128 and/or the housing 126. In some example embodiments, the transducer array may be a phased transducer array, e.g. a "phased array," which may be housed inside the nosecone 128 or housing 126. The phased array may include a plurality of transducer elements arranged on a PCB (printed circuit board). The PCB may mechanically support and electrically connect the electronic components, including the transducer elements using conductive tracks (e.g. traces), pads, and other features. In some embodiments, the PCB may also support the acoustic speaker, such that both the transducer elements and the acoustic speaker are disposed on the same PCB. In some embodiments, the conductive tracks may comprise traces etched onto the circuit board. The conductive tracks may comprise sets of traces, for example, each transducer elements may be mounted to the PCB such that the transducer element is in electrical communication with a set of traces. For example, the terminals of a transducer element may be soldered or otherwise electrically connected and mechanically secured to one or more pads of a PCB wherein each pad is in electrical communication with a trace etched onto the circuit board. For example, each transducer element may comprise one or more silver-plated terminals or other conductive material-plated terminals. Thus, each transducer element may be in electrical communication with a set of traces comprising the PCB (e.g., via the transducer element terminals). Each transducer element, sub-array, and/or the array of transducer elements may be configured to transmit one or more sonar pulses and/or receive one or more sonar returns.

The transducer arrays or individual transducer elements may transmit one or more sonar beams 110 into a body of water 102 with a transmit transducer, a transmit/receive transducer, or similar device. When the sound waves, of the sonar beams 110, strike anything of differing acoustic impedance (e.g., the sea floor or something suspended in the water above the bottom 106), the sound waves reflect off that object. These echoes or sonar returns may strike a sonar transducer or a separate sonar receiver element, which converts the echoes back into an electrical signal which is processed by a processor (e.g., processing circuitry 407 as discussed in reference to FIGS. 3 and 4) and sent to a display (e.g., an LCD) mounted in the cabin or other convenient location in the vessel. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment.

In an example embodiment, the one or more transducers may include multiple transducer arrays and/or transducer elements cooperating to receive sonar returns from the underwater environment. The transducer arrays and/or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a three-dimensional position of the sonar returns (and, for example, a corresponding object in the underwater environment).

In some example embodiments, the returns from a plurality of the transducer arrays and/or transducer elements may be compared via the process of interferometry to generate one or more angle values. Interferometry may involve determining the angle to a given sonar return via a phase difference between the returns received at two or more transducer arrays and/or transducer elements. In some embodiments, the process of beamforming may be used in conjunction with the plurality of transducer arrays and/or transducer elements to generate one or more angle values associated with each sonar return. Beamforming may involve generating a plurality of receive-beams at predetermined angles by spatially defining the beams based on the relative phasing of the sonar returns and detecting the distance of the sonar returns in each respective beam. Beamforming and interferometry are further described in U.S. patent application Ser. No. 14/717,458, entitled "Sonar Systems using Interferometry and/or Beamforming for 3D Imaging" and U.S. patent application Ser. No. 14/683,573, entitled Systems and Associated Methods for Producing a 3D Sonar Image," both of which are assigned to the Assignee of the present application and are hereby incorporated by reference herein in their entireties.

In some implementations, the transducer arrays and/or transducer elements are each capable of generating a separate sonar beam 110. The sonar beams 110 may include, for example, one or more of a conical beam projection and a linear beam projection (though other beam shapes are contemplated). For instance, the sonar beams 110 may include a conical downscan beam projection having a coverage area of a beam produced by a circular downscan transducer. In another instance, the sonar beams 110 may include a linear downscan beam projection having a coverage area of a beam produced by a linear downscan transducer.

In some embodiments, the trolling motor 120 may be electrically coupled to a computing device 134 via one or more electrical wires or cables 132 passing through the shaft 124. The computing device 134 may be a marine electronics device (e.g., multi-function display (MFD), smart phone, etc.) for recording sonar data signals received from the transducer array via the electrical cables 132. The computing device 134 may also be configured for controlling operation of the motor via the electrical cables 132. Thus, control signals may be transmitted from the computing device 134 to the motor via the electrical cables 132 for controlling operation of the motor. In some instances, operation of the motor is controlled by the computing device 134 including user interaction with the computing device 134. In some other instances, operation of the motor may be controlled via user interaction with a foot-pedal (not shown) positioned on the vessel 140. Additionally the computing device may be configured to control operations of the one or more transducers and/or the acoustic speaker.

FIG. 2A illustrates a block diagram of a trolling motor 200 in accordance with various implementations described herein. In various implementations, the trolling motor 200 may include and/or incorporate use of various types of electrically and/or mechanically steered trolling motors. In some instances, some trolling motors may be electrically steered via a remote device, foot pedal, or multi-functional display (MFD). In other instances, some trolling motors may be mechanically steered via a handheld tiller type control or a mechanical cable steered foot pedal.

The trolling motor 200 may include a sonar transducer and acoustic speaker ("STAS") assembly. The STAS assembly may include one or more sonar transducers 210, e.g. one or more transducer arrays or one or more transducer elements. The STAS assembly may also include an acoustic speaker 217. The trolling motor 200 may include a device having a housing 202 configured to encapsulate a motor 234. The housing 202 includes a nosecone 204, which may house the sonar transducer 210 and acoustic speaker 217. The trolling motor 200 includes a propeller 238 coupled to the motor 234 via a drive shaft 236. The trolling motor 200 includes a steering shaft 206 that couples the motor 234 (and housing 202) to a vessel (e.g., a boat). The motor 234 may include an electric motor, and the motor 234 may be configured to drive the propeller 238 in water to provide thrust for the vessel in a body of water 102 during operation of the electric motor. The trolling motor 200 may include a fin 208 for stability in water during movement.

Figure 2C:
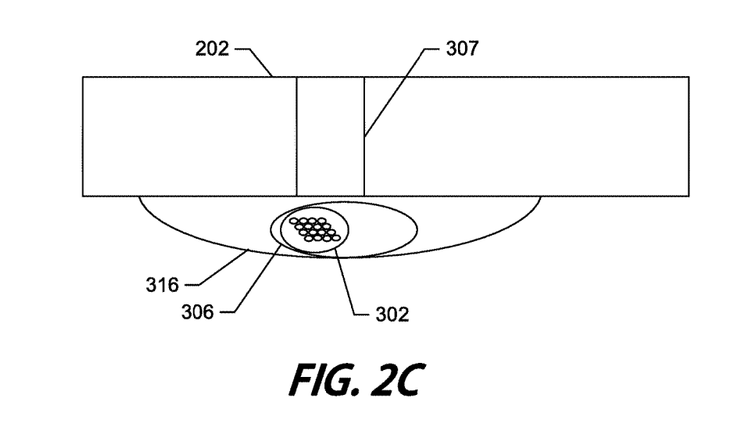

Additionally or alternatively, one or more sonar transducers 210 (such as a phased array, down scanning transducer array, side scanning transducer array, etc.) and the acoustic speaker 217 may be housed in the housing 202. As depicted in FIG. 2B, the housing 202 may be shaped to house the sonar transducer 210, such as a hydrodynamic projection 216 from the bottom and/or sides of the housing 202. In some embodiments, the sonar transducer 210 and acoustic speaker 217 may be disposed within the housing 202 without alteration to the hydrodynamic, e.g. torpedo shape. For example, in an instance in which the sonar transducer 210 is a phased array, there may be sufficient space to house the PCB between the motor 234 and the housing 202 or the circumference of the motor housing may be increased to allow sufficient space to house the sonar transducer 210 and acoustic speaker 217. In still a further example embodiment, the sonar transducer 210 and the acoustic speaker 217 may be housed in a dedicated housing 316, as depicted in FIG. 2C. The dedicated housing 316 may be operably coupled to the housing 202 by one or more mounting elements 307. The mounting elements 307 may include, without limitation, a pipe clamp, cable tie, screws, adhesive, or the like. Although, the sonar transducer 210 and acoustic speaker 217, e.g. the STAS assembly, is generally discussed in association with the trolling motor 120, one of ordinary skill in the art would immediately appreciate that the STAS assembly may be operably coupled to any portion of the vessel which is submerged, such as the hull.

In some example embodiments, the trolling motor 200 may also include an electromagnetic field (EMF) damper 214. The EMF damper 214 may be positioned between the motor 234 and electronic components within the housing 202, such as the sonar transducer 210, the sensors 220, and/or the motor controller 230. The EMF damper 214 may include one or more EMF shielding materials, such as fabrics, textiles, plastics, glass, paints, foils, ribbon, or wire, configured to reduce or prevent electromagnetic interference caused by an electromagnetic field produced by the motor 234. In some embodiments, the EMF damper 214 may additionally or alternatively include vibration or acoustic dampening material, such as rubber, to prevent vibrations of the motor 234 or acoustic speaker 217 from interfering with reception of sonar beams 110. In some example embodiments, the sonar transducer 210 and the acoustic speaker 217 may operate on different frequencies to prevent acoustic interference. For example the acoustic speaker 217 may emit fish attraction sounds that are less than about 50 Hz and the one or more sonar transducers 210 may operate between about 15 kHz and about 200 kHz.

The steering shaft 206 may incorporate use of a first electrical cable 232 for controlling operation of the motor 234 via a motor controller 230. Operation of the motor 234 may be controlled by a variable power supply, such as a foot-pedal, that provides variable control signals to the motor controller 230. The motor controller 230 may relay the variable control signals to the motor 234 to drive the motor 234. In another instance, operation of the motor 234 may be controlled by an external computing device, such as the computing device 134 in FIG. 1. In this instance, the external computing device may provide variable control signals to the motor controller 230, and the motor controller 230 may relay the variable control signals to the motor 234 to drive the motor 234.

The steering shaft 206 may incorporate use of a second electrical cable 212 for transmitting sonar data signals from the sonar transducer 210 to a computing device, such as the computing device 134 in FIG. 1. The sonar data generated and transmitted by the sonar transducer 210 may be used for imaging environmental features in the body of water 102.

The trolling motor 200 may include one or more sensors 220 incorporated within the nosecone 204. Further, the steering shaft 206 may incorporate use of a third electrical cable 222 for transmitting sensor data signals from the one or more sensors 220 to a computing device, such as the computing device 134 in FIG. 1. The one or more sensors 220 may include a dedicated sensor (e.g., water sensor) configured for sensing deployment/removal of the trolling motor 200 in/from the body of water 102. For instance, the dedicated sensor may include electrode terminals (not shown) configured to activate (e.g., power-up) the transducer assembly or transducer array 210 when the trolling motor 200 is deployed in water. The electrode terminals may be configured to deactivate (e.g., power-down) the transducer assembly or sonar transducer 210 when the trolling motor 200 is removed from water. The one or more sensors 220 may include one or more environmental sensors, such as a temperature sensor. Additionally or alternatively, the one or more sensors 220 may include an orientation or direction sensor.

Figure 2D:
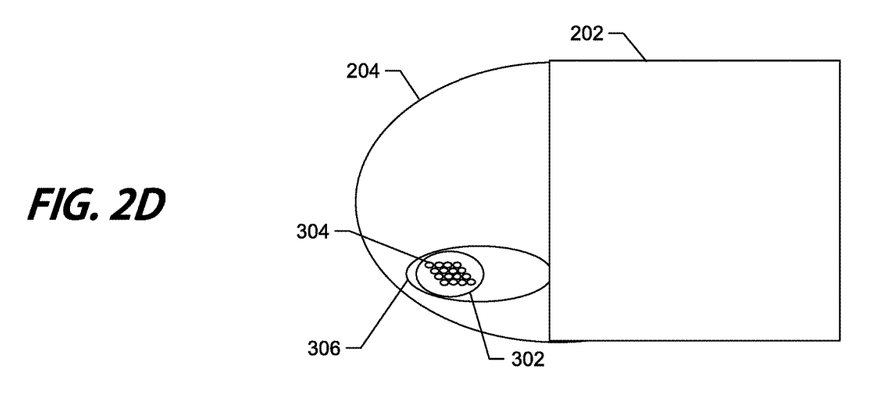

FIGS. 2C and 2D illustrate examples of the trolling motor 120 including an emitting surface 302. The emitting surface 302 may be a portion of the housing 202 or the dedicated housing 316 configured to transmit the fish attraction sound emitted from the acoustic speaker 217 to the body of water 102. The acoustic speaker 217 may be oriented within the housing 202 or dedicated housing 316, to be aligned with the emitting surface 302. The emitting surface 302 may be in contact with an output of the acoustic speaker 217 to maximize transfer of sound from the acoustic speaker 217, through the emitting surface 302, and into the body of water 102. In some embodiments, the emitting surface 302 may be have a thinner thickness than the surrounding material of the housing 202 or the dedicated housing 316 to limit attenuation of the fish attraction sound. In some embodiments, the emitting surface 302 may have one or more holes 304 or recesses, to further limit attenuation of the fish attraction sound. In some example embodiments, the holes 304 may include a diaphragm, such as a flexible plastic or rubber material, configured to provide negligible attenuation to the fish attraction sound and maintain waterproof integrity of the housing 202 or the dedicated housing 316.

In some example embodiments, the housing 202 or the dedicated housing 316 may include a flow baffle 306. The flow baffle 306 may be configured to direct water around the emitting surface 302. By directing the flow of water around the emitting surface 302 the flow baffle 306 may prevent debris or other water features from striking the emitting surface, which may cause damage to the acoustic speaker 217, and maintain the streamlined form of the housing 202 or dedicated housing 316.

Example System Architecture

Figure 3:
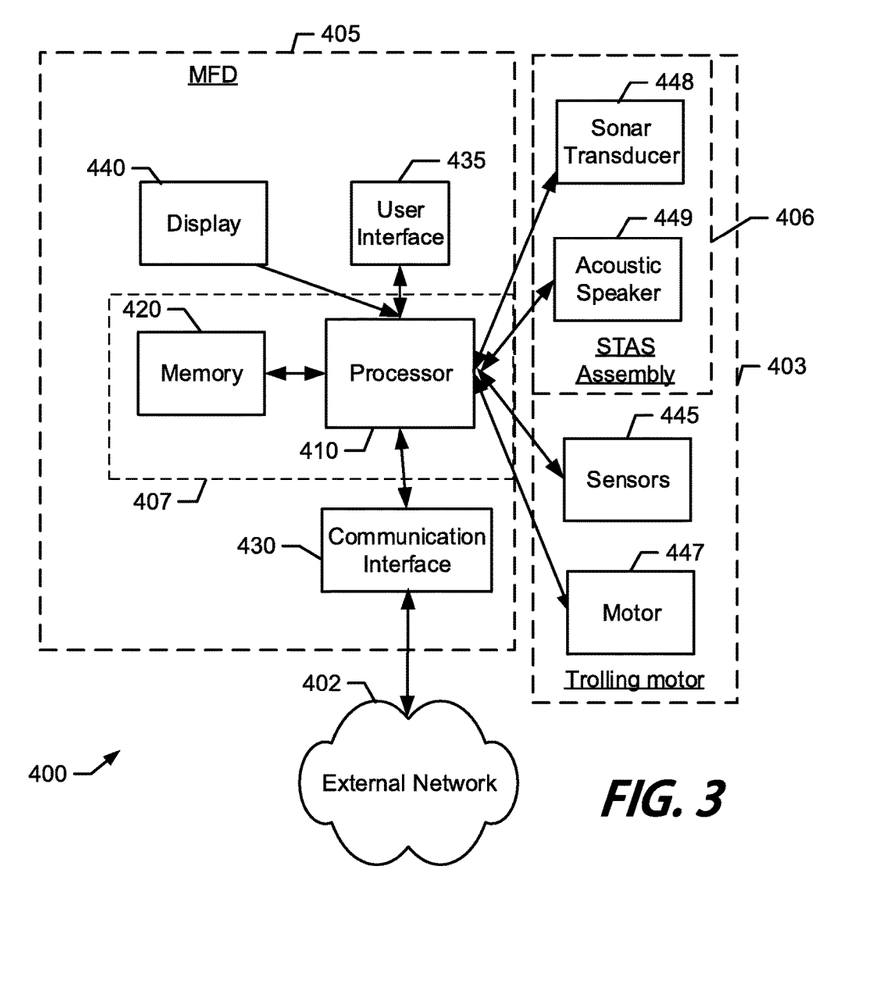
FIGS. 3 and 4 illustrate block diagrams of example multi-function displays and marine devices, in accordance with various embodiments described herein.
Figure 4:
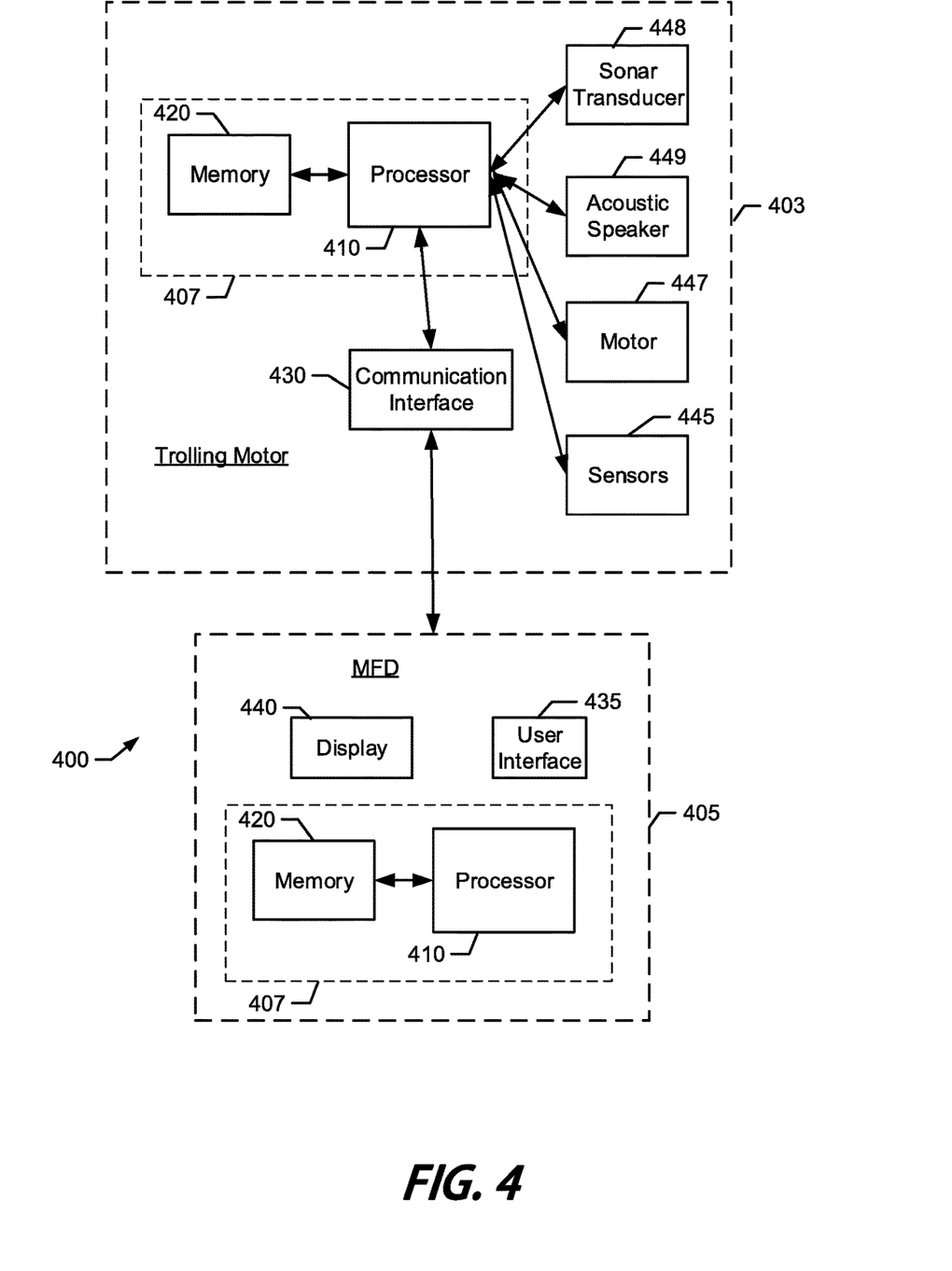

FIGS. 3 and 4 illustrate block diagrams of example marine devices 400. The example marine devices 400 may include one or more computing devices, such as an MFD 405, user device, or the like, a trolling motor 403, and a STAS assembly 406. The STAS assembly 406 may include a one or more transducers, such as a sonar transducer 448, and an acoustic speaker 449. The STAS assembly 406 may be operably coupled to the trolling motor 403, as depicted in FIG. 3, or integral to the trolling motor 403, as depicted in FIG. 4. The trolling motor 403 may include a motor 447 and sensor 445. The trolling motor 405 may include dedicated processing circuitry 407, as depicted in FIG. 4, and/or may utilize processing circuitry of the MFD 405, as depicted in FIG. 3. Example marine devices 400 are described in further detail below.

The MFD 405 may include a number of different modules or components, each of which may comprise any device or means embodied in either hardware, software, or a combination of hardware and software configured to perform one or more corresponding functions.

The MFD 405 may also include one or more communications modules configured to communicate with one another in any of a number of different manners including, for example, via a network 402. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices, such as one or more wired or wireless additional multi-function displays may be included in a marine data system.

The MFD 405 may include a processor 410, a memory 420, a user interface 435, a display 440, and a communication interface 430.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data and generate a fishing activity report. For example, the processor 410 may be configured to cause transmission of a sonar beam, receive sonar returns, and cause sonar images to be displayed on the display 440 based on the sonar returns. The processor 410 may also be configured to cause the acoustic speaker 449 to emit fish attraction noises into the body of water. Additionally, the processor 410 may be configured to determine fish activity and compare the fish activity to one or more fish activity thresholds. In some example embodiments, the processor 410 may determine an acoustic target depth of the fish attract noise based on the sonar returns. Accordingly, the processor 410 may be configured to adjust the operating parameters of the acoustic speaker 449 to maximize output at the target depth.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. vessel, etc.

The memory 420 may be configured to store instructions, computer program code, marine data, such as sonar data, chart data, location/position data, and other data associated with the navigation system in a non-transitory computer readable medium for use, such as by the processor.

The communication interface 430 may be configured to enable connection to external systems (e.g. an external network 402). In this manner, the MFD 405 may retrieve stored data from a remote, external server via the external network 402 in addition to or as an alternative to the onboard memory 420.

The sensor 445 may be a water sensor configured to indicate if the motor 447 and/or transducer array 448 are submerged. The sensor may indicate submergence of the motor 447, sonar transducer 448, and/or acoustic speaker 449 to the processor 410. The processor 410 may limit operation of the motor 447, sonar transducer 448, and/or acoustic speaker 449 when the sensor 445 indicates that the motor 447, sonar transducer 448, and/or acoustic speaker 449 is not submerged. Additional sensors may be configured to determine the current position and/or location of the MFD 405. For example, a position sensor may comprise a GPS, bottom contour, inertial navigation system, such as machined electromagnetic sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the vessel. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the displays 440 of FIGS. 3 and 4 are shown as being directly connected to the processor 410 and within the MFD 405, the display 440 could alternatively be remote from the processor 410 and/or MFD 405. Likewise, in some embodiments, the user interface 435 could be remote from the MFD 405.

The sonar transducer 448 may be housed in a trolling motor 403, or operably coupled to the trolling motor 403, such as in a dedicated housing. In an example embodiment, the sonar transducer 448 may be attached to the hull or other location on the vessel. The sonar transducer 448 may be configured to gather sonar data, e.g. sonar returns, from the underwater environment relative to the vessel. Accordingly, the processor 410 may be configured to receive the sonar data from the sonar transducer 448, process the sonar data to generate an image including a sonar image based on the gathered sonar data. In some embodiments, the MFD 405 may be used to determine depth and bottom contours, detect fish, locate wreckage, etc. Sonar beams or pulses, from a sonar transducer 448, can be transmitted into the underwater environment. The sonar signals reflect off objects in the underwater environment (e.g. fish, structure, sea floor bottom, etc.) and return to the transducer assembly, which converts the sonar returns into sonar data that can be used to produce an image of the underwater environment.

The acoustic speaker 449 may be housed in the housing of the trolling motor 403, or operably coupled to the trolling motor 403, such as in a dedicated housing. In an example embodiment, the acoustic speaker 449 may be attached to the hull or other location on the vessel. The acoustic speaker 449 may be configured to emit one or more fish attraction sounds into the body of water to attract fish. The fish attraction noises may be configured to attract bait fish, which may in turn attract larger target fish. In some example embodiments, the fish attraction sound may be configured for a specific type of fish or species. In an example embodiment, the fish attraction sounds may simulate sound made by fish to indicate a feeding frenzy, distress or the like.

The motor associated with the trolling motor 403 may be configured to provide propulsion to the vessel at a relatively slow rate of speed, to allow the vessel to maintain a position on the body of water or move slowing, while limiting disturbance to the water. This may provide propulsion capability, without causing fish to flee the area.

Example Flowchart(s) and Operations

Embodiments of the present invention provide methods, apparatus and computer program products for operating an acoustic speaker. Various examples of the operations performed in accordance with embodiments of the present invention will now be provided with reference to FIG. 5.

Figure 5:
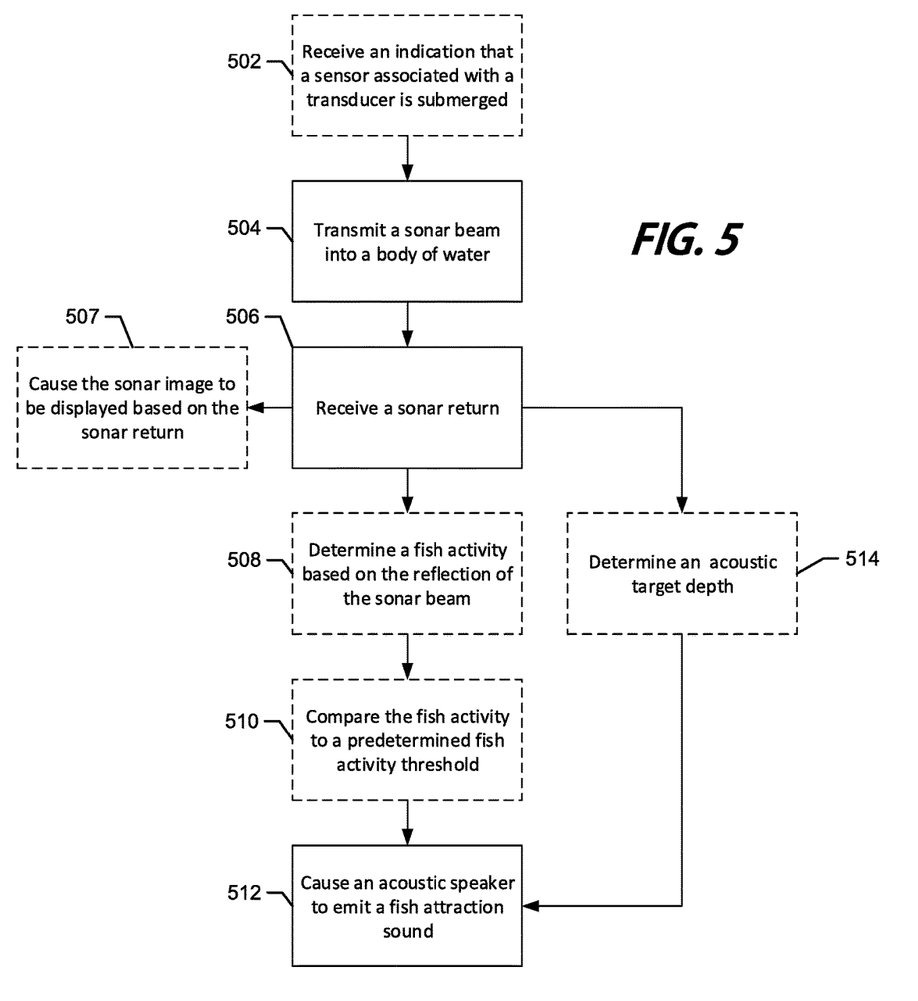
FIG. 5 illustrates a flowchart of an example method of operating the marine device, in accordance with various embodiments described herein.

FIG. 5 illustrates a flowchart according to an example method for operating an acoustic speaker according to an example embodiment. The operations illustrated in and described with respect to FIG. 5 may, for example, be performed by, with the assistance of, and/or under the control of one or more of the processor 410, memory 420, communication interface 430, user interface 435, display 440, sensors 445, motor 447, sonar transducer 448, and/or acoustic speaker 449. The method may include transmitting one or more sonar beams into a body of water at operation 504, receiving one or more sonar returns at operation 506, and causing an acoustic speaker to emit a fish attraction sound at operation 512.

In some embodiments, the method may include additional, optional operations, and/or the operations described above may be modified or augmented. Some examples of modifications, optional operations, and augmentations are described below, as indicated by dashed lines, such as, receiving an indication that a sensor associated with a transducer is submerged at operation 502. The transducers may, accordingly, transmit the sonar beam in response to the indication of the transducer being submerged.

The method may also include causing the sonar image to be displayed based on the one or more sonar returns at operation 507. The sonar image may be displayed on a display including fish, objects, depth, and the like.

In some example embodiments, the method may also include determining a fish activity based on the reflection of the sonar beam at operation 508. The fish activity may be a number of fish detected in a sonar return or sonar image, such as 5 fish, 10 fish, or the like. In some embodiments, the fish activity may also classify the detected fish by size such as 3 large fish, e.g. 25 inches or greater; 3 medium fish, e.g. 12 inches to 24 inches; and 1 small fish, e.g. less than 12 inches. The fish classification may be set for the type of fishing, such as fresh water lake, ocean, river, or the like, which may include larger or smaller settings for each classification.

The method may additionally include comparing the fish activity to a predetermined fish activity threshold at operation 510. In an example embodiment, the acoustic speaker may emit the fish attraction sound in response to the fish activity satisfying a predetermined fish activity threshold. The predetermined fish activity threshold may include less than a predetermined number of fish or fish in a fish classification, more than a predetermined number of fish in one or more of the fish classifications, among others. In some example embodiments, the method may include determining an acoustic target depth at operation 514. The acoustic target depth may be based on the location of one or more fish in the sonar return or sonar image, the bottom 106 of the body of water 102, a target type, e.g. species, of fish, or the like.

FIG. 5 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A marine device comprising:
    a waterproof housing including a mounting element, wherein the housing is configured to be at least partially submerged in an underwater environment, wherein the mounting element is configured to attach to at least one of a vessel or a trolling motor;
    at least one transducer configured to transmit one or more sonar beams into the underwater environment, wherein the at least one transducer is positioned and oriented within the housing such that the at least one transducer is configured to transmit one or more sonar beams into a portion of the underwater environment when the housing is at least partially submerged;
    an acoustic speaker configured to emit a fish attraction sound into the underwater environment, wherein the acoustic speaker is positioned within the housing with the at least one transducer, wherein the acoustic speaker is positioned and oriented within the housing such that the acoustic speaker is configured to emit the fish attraction sound into the underwater environment when the housing is at least partially submerged; and
    processing circuitry configured to control operations of both the acoustic speaker and the at least one transducer, wherein the processing circuitry is further configured to:
        determine fish activity based on sonar data received by the at least one transducer; and
        cause the speaker to emit the fish attraction sound in response to the determination of fish activity.

2. The marine device of claim 1, wherein the marine device is configured to be operably coupled to a trolling motor.

3. The marine device of claim 1, wherein the marine device is configured to be operably coupled to a hull of a vessel.

4. The marine device of claim 1, wherein the fish attraction sound comprises a bait fish attraction sound.

5. The marine device of claim 1, wherein the fish attraction sound comprises a fish distress sound or a feeding frenzy sound.

6. The marine device of claim 1 further comprising:
    insulation material disposed between the at least one transducer and the acoustic speaker.

7. The marine device of claim 6, wherein the insulation material is magnetic or acoustic insulation.

8. The marine device of claim 1, wherein the processing circuitry is disposed within the housing.

9. The marine device of claim 1, wherein the at least one transducer and the acoustic speaker are disposed on the same printed circuit board.

10. The marine device of claim 1, wherein the housing defines an emitting surface designed to enable transmission of the sound emitted from the acoustic speaker into the underwater environment, wherein the emitting surface defines at least one of a different material or different thickness as compared to at least some of the housing, and wherein the speaker is oriented within the housing to align with the emitting surface.

11. The marine device of claim 10, wherein the housing further comprises:
    a flow baffle configured to direct the flow of water around the emitting surface.

12. The marine device of claim 1, wherein the housing is streamlined.

13. The marine device of claim 1, wherein the at least one transducer and the acoustic speaker are configured to operate in different frequencies.

14. The marine device of claim 1, wherein the processing circuitry is further configured to cause the speaker to emit the fish attraction sound in response to a determination that a predetermined number of fish are present based on the sonar data.

15. The marine device of claim 1, wherein the processing circuitry is further configured to:
    determine an acoustic target depth based on the sonar data; and
    adjust operating parameters of the speaker to maximize output of the fish attraction sound at the acoustic target depth.

16. A marine device comprising:
    a motor;
    a propeller coupled to the motor;
    a shaft configured to couple the motor to the vessel, wherein the shaft is configured to rotate relative to the vessel;
    a waterproof housing configured to encapsulate the motor and be at least partially submerged in an underwater environment,
    at least one transducer configured to transmit one or more sonar beams into the underwater environment, wherein the at least one transducer is positioned and oriented within the housing such that the at least one transducer is configured to transmit one or more sonar beams into a portion of the underwater environment when the housing is at least partially submerged;
    an acoustic speaker configured to emit a fish attraction sound into the underwater environment, wherein the acoustic speaker is positioned within the housing with the at least one transducer, wherein the acoustic speaker is positioned and oriented within the housing such that the acoustic speaker is configured to emit the fish attraction sound into the underwater environment when the housing is at least partially submerged; and
    processing circuitry configured to control operations of both the acoustic speaker and the at least one transducer, wherein the processing circuitry is further configured to:
        determine fish activity based on sonar data received by the at least one transducer; and
        cause the speaker to emit the fish attraction sound in response to the determination of fish activity.

17. The marine device of claim 16, wherein the fish attraction sound comprises a bait fish attraction sound, a fish distress sound, or a feeding frenzy sound.

18. The marine device of claim 16, wherein the shaft defines an internal passage, and the marine device further comprises:
    at least one electrical cable that leads from the at least one transducer or the acoustic speaker through the internal passage of the shaft to enable electrical signals to be transmitted between the at least one transducer or the acoustic speaker and a computing device, wherein the electrical cable is contained within the internal passage of the shaft so as to protect the electrical cable while still enabling rotation of the shaft and housing.

19. The marine device of claim 16 further comprising:
insulation material disposed between the at least one transducer and the acoustic speaker, wherein the insulation material is magnetic or acoustic insulation.

20. The marine device of claim 16, wherein the processing circuitry is disposed within the housing.

* * * * *